United States Patent
Capots et al.

(10) Patent No.: US 7,292,789 B1
(45) Date of Patent: Nov. 6, 2007

(54) MULTI-CHANNEL WIDE-FIELD LASER COMMUNICATIONS METHOD AND APPARATUS

(75) Inventors: Larry H. Capots, Mountain View, CA (US); Robert Sigler, Cupertino, CA (US); Kenneth Triebes, Manhattan Beach, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 923 days.

(21) Appl. No.: 10/412,631

(22) Filed: Apr. 10, 2003

(51) Int. Cl.
*H04B 10/00* (2006.01)
*H04B 7/185* (2006.01)
*H04Q 7/20* (2006.01)

(52) U.S. Cl. .................. 398/125; 398/121; 398/122; 398/123; 398/124; 455/12.1; 455/13.1; 455/427

(58) Field of Classification Search ............... 398/121, 398/122, 123, 124, 125; 455/12.1, 13.1, 455/427
See application file for complete search history.

(56) References Cited

U.S. PATENT DOCUMENTS

| | | | |
|---|---|---|---|
| 5,119,225 A * | 6/1992 | Grant et al. ................ 398/123 |
| 5,390,040 A * | 2/1995 | Mayeux ..................... 398/129 |
| 6,268,944 B1 * | 7/2001 | Szapiel ...................... 398/129 |
| 6,333,811 B1 * | 12/2001 | Tatian et al. ................. 35/366 |
| 6,839,519 B1 * | 1/2005 | Kleiner et al. .............. 398/121 |
| 2004/0001720 A1 * | 1/2004 | Krill et al. .................. 398/125 |

* cited by examiner

*Primary Examiner*—Kenneth Vanderpuye
*Assistant Examiner*—Ken Malkowski
(74) *Attorney, Agent, or Firm*—McDermott Will & Emery LLP

(57) ABSTRACT

A communications terminal includes a first aperture configured to receive laser signals from ground laser sources, pick-off mirrors configured to receive laser signals from mobile laser sources, an optical assembly configured to receive the laser communications signals from ground laser sources and mobile laser sources, wherein the optical assembly is configured to focus laser signals onto a common focal plane, and laser receivers located at the focal plane configured to receive laser signals from at least one laser source at a time.

19 Claims, 8 Drawing Sheets

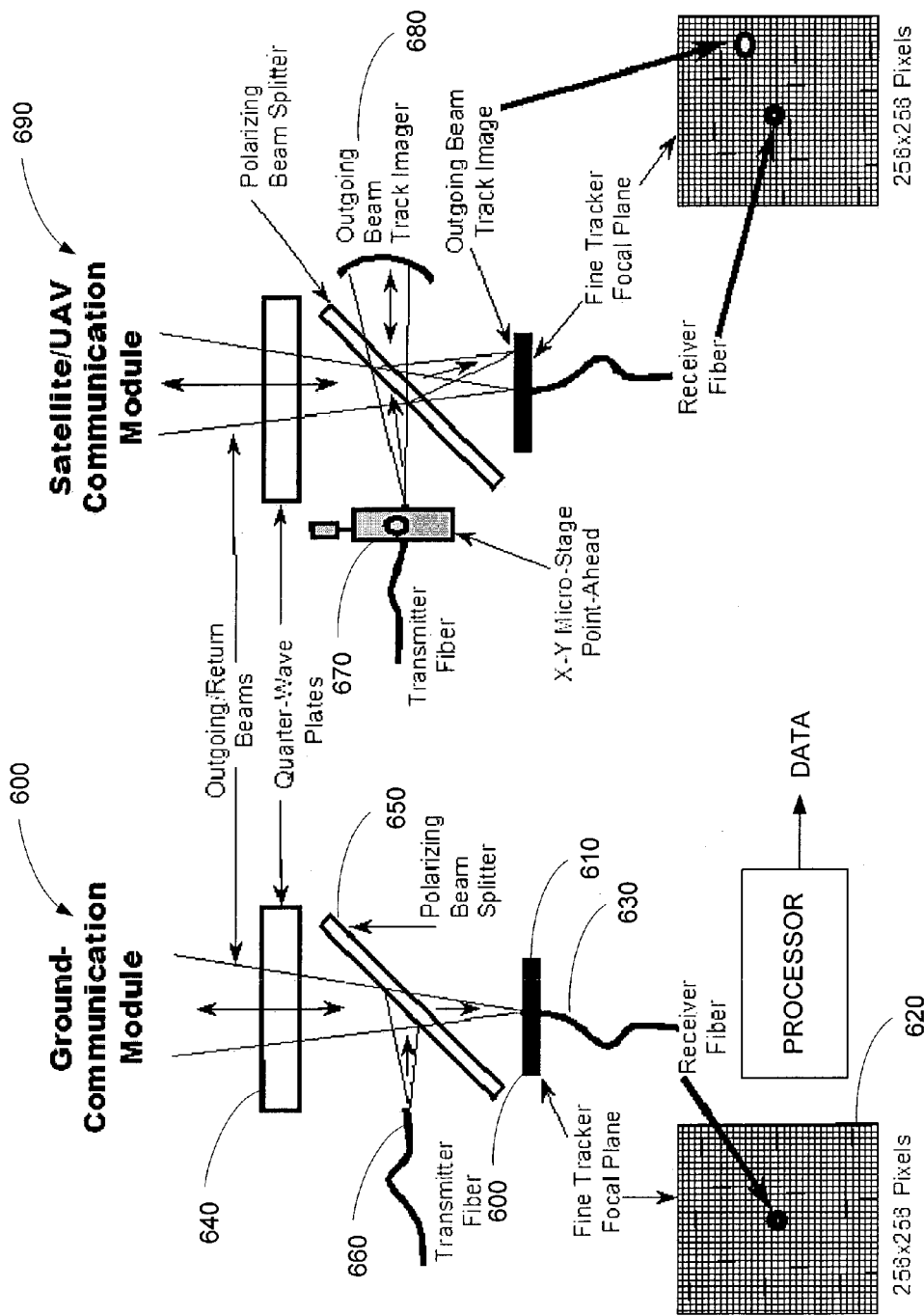

MULTI-CHANNEL WIDE-FIELD LASER COMMUNICATIONS METHOD AND APPARATUS

CROSS-REFERENCES TO RELATED APPLICATIONS

The present invention is related to and incorporates by reference, for all purposes, application Ser. No. 10/356,359, filed Jan. 31, 2003.

BACKGROUND OF THE INVENTION

Communications via satellites, that forty years ago was novel, has now become common. Whether the communications are telephone calls, the latest video for the 10 O'clock news, or surfing the web, etc., the concept of sending a signal to a satellite, and having the satellite rebroadcast the signal is well established. Typical state of the art satellites broadcast signals in the range of 3-30 Gigahertz, with corresponding data rates of up to 20 Mbits/second.

Although this data rate may sound impressive at first, the inventors of the present invention have contemplated that in the future, a substantially higher data satellite rates will be required. For example, the inventors contemplate that satellite data rates in the order of Terahertz may be necessary.

One method contemplated by the inventors for increasing the data bandwidth is to increase the number of communications satellites. Drawbacks to this approach include that communications satellites are very expensive to manufacture and maintain over the lifespan. Another drawback is that the skies are getting crowded, thus the number of satellites that can be put into orbit is diminishing.

Another solution contemplated by the inventors to increase the bandwidth has been to use optical system and lasers for communications. In particular, the inventors have considered selected concepts explored in the non-related field of weapon systems for ideas. Some concepts include missile acquisition, pointing and tracking using transmit and receive optical systems. Some specific directed energy weapons programs include multi-target tracking such as Talon Gold, LODE, StarLab, ADAPT, and CF & TDP. Such programs devote a great quantity of hardware and software resources for acquisition of an incoming missile. However, for communications, such resources are not as important, because communications terminals deliberately signal their presence.

In light of the above, what is required are improved methods and apparatus for acquisition and tracking of multiple independently target laser communications devices. Further, what is required are methods and apparatus for providing such solutions in economical ways.

BRIEF SUMMARY OF THE INVENTION

The present invention relates to acquisition and tracking of multiple independently targeted laser communications devices. More specifically, the present invention relates to a wide-field optical system for laser communications.

According to one aspect of the present invention, acquisition and tracking of multiple independently targeted laser communications devices from a single optical system is provided. A wide range of laser communications devices (channels, terminals) are supported, including relatively stationary devices, such as ground platforms and highly mobile platforms, such as satellites and aerial platforms.

The present patent disclosure describes a multi-channel laser communications system in geosynchronous, or geostationary (GEO) orbit. Embodiments of the laser terminal are capable of conducting simultaneous laser communications with multiple laser platforms (e.g. satellites) in low earth orbit (LEO), medium earth orbit (MEO), and GEO. Additionally, the terminal is also capable of conducting simultaneous laser communications with multiple unmanned aerial vehicles in multiple theaters of operation, and multiple ground terminals distributed across the earth, but having line-of-sight access to the communications system.

Embodiments of the present invention rely upon a single wide-field of view optical system to transmit and to receive multiple laser communications from a variety of laser sources. By using a unified wide field of view optical system, the laser platform has reduced weight and reduced volume. In one embodiment, the GEO platform uses a 20 degree field of view optical configuration to receive laser communications to and from multiple sources. It is contemplated that such a platform may be able to simultaneously communicate with more than 300 ground based channels, more than 30 satellite, and/or more than 30 multi-channel airborne sources. Further, it is contemplated that single-channel full duplex communications may exceed bit rates of more than 10 gigabits per second per channel.

In various embodiments, the wide field optical system is combined with multiple transmit/receive (TR) modules located at a focal plane of the optical system. The TR modules incorporate transmitter and receiver optical fibers for sending and receiving laser communications. Optical fibers may be integrated with a fine tracking mechanism to improve upon reception of laser transmissions. This fine tracking mechanism may also be used to help correctly orient transmitter optical fibers to compensate for relative movements of the source and receiver.

In embodiments of the present invention, ground channels are directly feed to the wide field optical system. Further, for space and UAV channels, the laser transmissions are directed to the wide field optical system via a mirror assembly.

A wide field of view acquisition sensor keeps track of the location for all laser communications channels, and guides the acquisition process for the individual channels. For ground channels, the acquisition sensor data is used to reposition the TR module within the focal plane, and for space and UAV channels, the acquisition sensor data is used to position the orientation of the mirror assembly. In the present embodiments, the mirror assembly includes a steering (movable) mirror and a pick-off (static) mirror, whereby the orientation of the steering mirror allows laser communications to be received from and sent to laser channels.

GEO based laser communications platform as described herein, can exhibit cost, weight and volume benefits by projecting multiple independent channels using a common optical system. Embodiments of the common optical system are based on reflective triplet configuration and having a field of view (FoV) of about 20 degrees. The platform provides for acquisition, tracking, pointing, and communicating with satellites based in low earth orbit, medium earth orbit, and geosynchronous or geostationary orbits (respectively LEO, MEO, and GEO) and multiple high-altitude collector unmanned aerial vehicles (UAVs). Additionally, the platform provides for acquisition, tracking, pointing, and communicating with a large number of ground based terminals, such as command and control facilities, mobile facilities, ocean-based facilities, and the like.

The approaches described herein uses a single optical system to project many, independent, high bandwidth laser communication beams from a common optical system. The wide-field multi-beam approach can have a significant effect on future laser communications architectures. Accordingly, the capabilities of different embodiments of the present invention may have a major impact on the architecture of future space based laser communication systems.

According to one aspect of the present invention, a communications terminal is described. The terminal may include a first aperture configured to receive laser communications signals from ground-based laser communications sources, and a plurality of pick-off mirrors configured to receive laser communications signals from mobile laser communication sources. The system may also include an optical assembly configured to receive the laser communications signals from ground-based laser communications sources and mobile laser communication sources, wherein the optical assembly is configured to focus laser communications signals from the ground-based laser communications sources and the mobile laser communications sources onto a focal plane, and a plurality of laser communications receivers located at the focal plane, wherein each laser communication receiver is configured to receive laser communications signals from at least one laser communications source at a time.

According to another aspect of the present invention, a method for a communications terminal is detailed. One technique includes receiving laser communications from a plurality of ground-channel laser communications sources, receiving laser communications from a plurality of mobile-channel laser communications sources, and directing the laser communications from the plurality of ground-channel laser communications sources and the laser communications from the plurality of mobile-channel laser communications sources onto a common focal plane. Various method may include receiving the laser communications from the plurality of ground-channel laser communications sources in plurality of ground communications modules, and receiving the laser communications from the plurality of mobile-channel laser communications sources in plurality of mobile communications modules.

According to yet another aspect of the present invention, a laser communications satellite is described. The satellite includes a first plurality of laser channel modules, each module configured to receive laser communications from at least a first class of laser communication sources, and a second plurality of laser channel modules, each module configured to receive laser communications from at least a second class of laser communication sources. An optical system is provided and configured to direct laser communications from the first class of laser communication sources to the first plurality of laser channel modules, and configured to direct laser communications from the second class of laser communication sources to the second, wherein at least one of the first plurality of laser channel modules is located at a focal point of the optical system, and wherein at least one of the second plurality of laser channel modules is located at a focal point of the optical system. Additionally, a movable assembly configured to direct laser communications from the second class of laser communication sources to the optical system is also provided.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 4 illustrates embodiments of transmit/receive modules according to the present invention.

DETAILED DESCRIPTION OF THE INVENTION

Figure 1A:
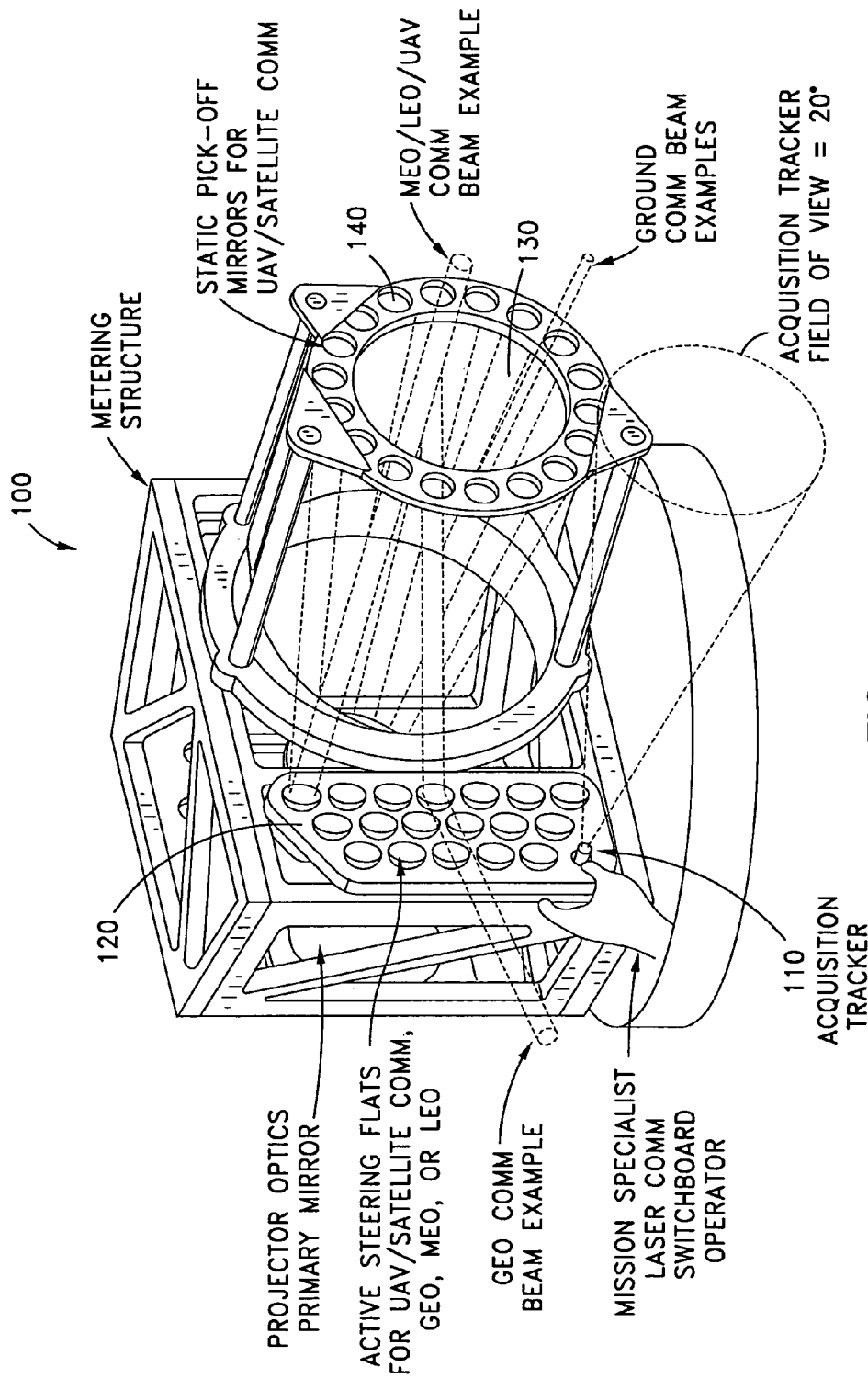
FIGS. 1A-C illustrate an embodiment of the present invention.
Figure 1B:
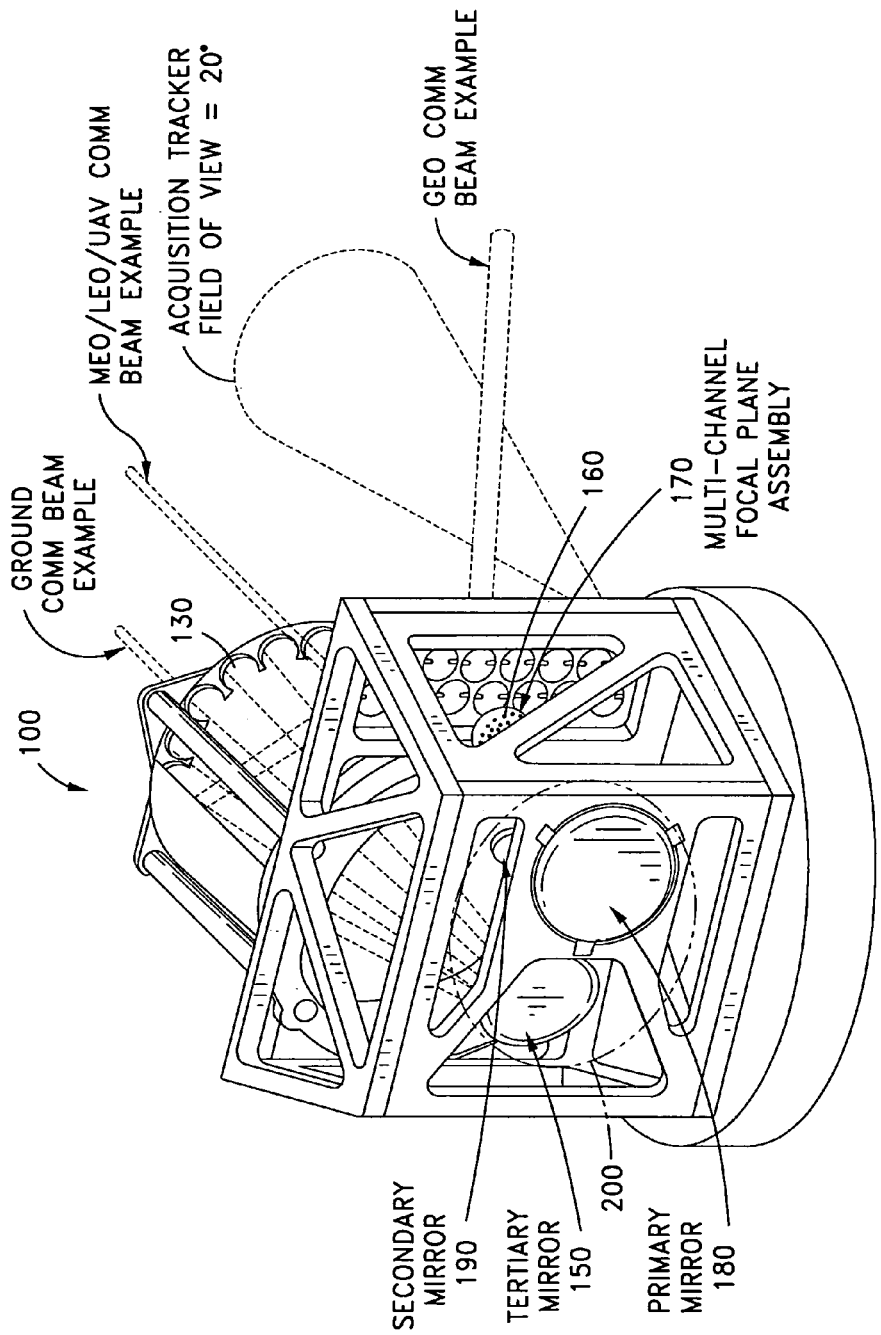
Figure 1C:
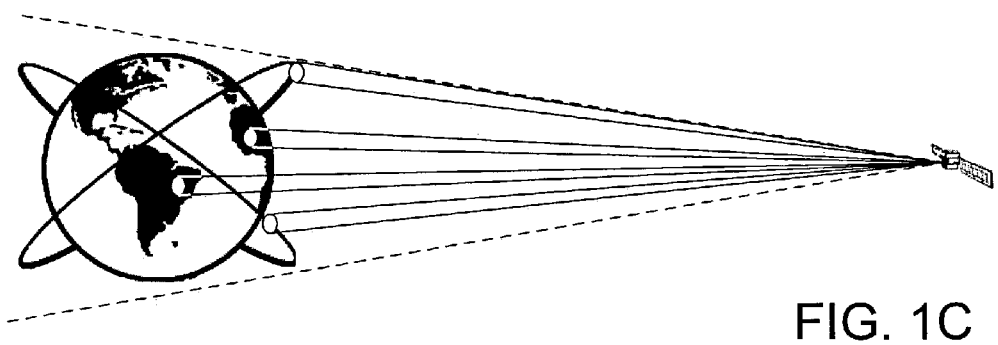

FIGS. 1A-C illustrate an embodiment of the present invention. In particular, FIGS. 1A and 1B illustrate a configuration of a wide-field laser communications system 100 in geosynchronous or geostationary orbit, as illustrated in FIG. 1C.

As illustrated in FIG. 1A, system 100 includes an acquisition tracker 110, steering mirrors 120, an aperture 130, and static mirrors 140. As illustrated in FIG. 1B, system 100 also includes an optical assembly 150, and a plurality of communication modules 160 located at a focal point 170 of optical assembly 150.

In the present embodiment, acquisition tracker (AT) 110 is laser communications tracking system with a field of view of approximately 20° so that the entire earth and orbiting satellites can be imaged by AT 110 without repositioning of system 100. In the embodiments where the field of view of AT 110 is lesser than approximately 17.4°, AT 120 can view the entire earth.

In one embodiment, AT 110 is capable of detecting, receiving, and tracking laser communications devices that are earth based, air based, space based, and the like. For example, earth based devices include laser communications from buildings, mobile vehicles, portable devices, ships, and the like; air based communication devices include laser communications from reconnaissance aircraft, airborne platforms, low altitude and high altitude unmanned aerial vehicles (UAVs), and the like; and satellite based communications devices include laser communications from satellites in low earth orbit (LEO), medium earth orbit (MEO), Geosynchronous earth orbit (GEO), or other space based source.

In one embodiment, AT 110 comprises a device with a 75 mm aperture. In other embodiments, other sized apertures may be used depending upon specific requirement. Embodiments of AT 110 may be derived from star tracking technologies. For example AT 110 may be derived from the star tracking portion of the Space Infrared Telescope Facility (SIRTF) scheduled to be launched in April 2003.

In another embodiment of the present invention, AT 110 includes a 100 mm diameter sensor that gives AT 110 an ability to identify laser communications with an accuracy of approximately <5.0 micro radians, or approximately 180 to 200 meters on the ground. In other embodiments, AT 110 may have a different resolution, for example higher or lower.

In one embodiment of the present invention, AT 110 may include low bit-rate laser transmission, i.e. the additional ability to transmit laser communications back to a detected laser communications device. Such capabilities would allow AT 110 to communicate and authenticate potential laser communications devices or terminals, before a communication module is linked to the device.

Referring back to FIG. 1A, in the present embodiment steering mirrors 120 include a mirror or a flat controlled by an actuation system. In present embodiment, mirrors 120 are configured to cover the same field of view as AT 110. In order to rapidly reorient or slew mirrors 120 to different channels or "theaters" that are separated by large angles, AT 110 first accurately determines an orientation or a steering angle for each of the steering mirrors 120. In this embodiment, AT 110 measures the difference in centroid locations between the current communications channel (theater) and the next theater. Based upon the difference, a steering angle for mirrors 120 are determined, and applied. In the present embodiment, AT 110 provides coarse pointing guidance, and fine pointing guidance is provided within laser communication modules 160, discussed below. Each steering mirror 120 can be independently pointed to different laser communications sources within the field of view of AT 110.

Steering mirrors 120 may be of a conventional design suitable for a space platform. In one embodiment, steering mirrors 120 are configured with orientation motors, and in other embodiments, steering mirrors 120 may include an optical phased array or other non-inertial beam steering technology. Such advances are believed to decrease the retargeting time by approximately two orders of magnitude between different theaters.

Steering mirrors 120 and static mirrors 140 are used in the present embodiment to direct laser communications from widely-separated positions within the field of view of AT 110, towards optical assembly 150. Further detail regarding optical assembly 150 will be discussed in conjunction with FIG. 2, below. In this example, a total of 18 steering mirrors 120 and static mirrors 140 are provided to direct laser communications from to satellites in LEO, MEO and GEO orbits as well as collector UAVs, towards optical assembly 150.

In other embodiments, a larger or a smaller number or steering mirrors and static mirrors may be used, according to specific architecture design. For example, in one embodiment 16 steering mirrors and 16 static mirror are provided: 12 for satellite channels and 4 for multi-beam UAV channel.

In the present embodiment, laser communications from ground sources pass through aperture 130 to optical assembly 150. In one specific embodiment, communications with more than 300 ground terminals could be supported, however in other embodiments, a larger or a smaller number or ground terminals may be supported according to specific architecture design. In this embodiment, coarse positioning data for laser communication modules 160 is provided by AT 110 and fine positioning data is provided internal to laser communication modules 160.

As will be discussed further below, in the present embodiment, laser communication modules 160 are typically articulated in X and Y directions by two-axis micro-stages, within focal plane 170. Modules 160 are configured within focal plane 170 in this embodiment such that any point on the ground can be accessed by at least one module 160.

FIG. 1B illustrates a rear view of system 100, including a primary mirror 180, a secondary 190, and a tertiary mirror 200 as well as the multi-channel focal plane assembly, modules 160.

The embodiment illustrated is large and has not been optimized to minimize system volume. However, it is believed that if the ring of static mirrors 140 are mounted on a deployable structure, the entire system should fit within the available envelope of a 5 meter shroud. Further in other embodiments, optical assembly 150 may be developed to reduce the volume of the projector optics by over ten times. The embodiment illustrated is an implementation example and is not necessarily indicative of how a final system would be configured. Many different configurations are envisioned to meet different mission requirements.

In the present embodiment, system 100 includes aperture 130 coupled to optical assembly 150 that has a 300 mm clear aperture. This aperture size is consistent with the radiometrics associated with transmitting greater than 10 gigabits per second from GEO to the surface of the earth, assuming 2 W of optical power per channel and operating at a wavelength of approximately 1.55 microns.

Figure 2:
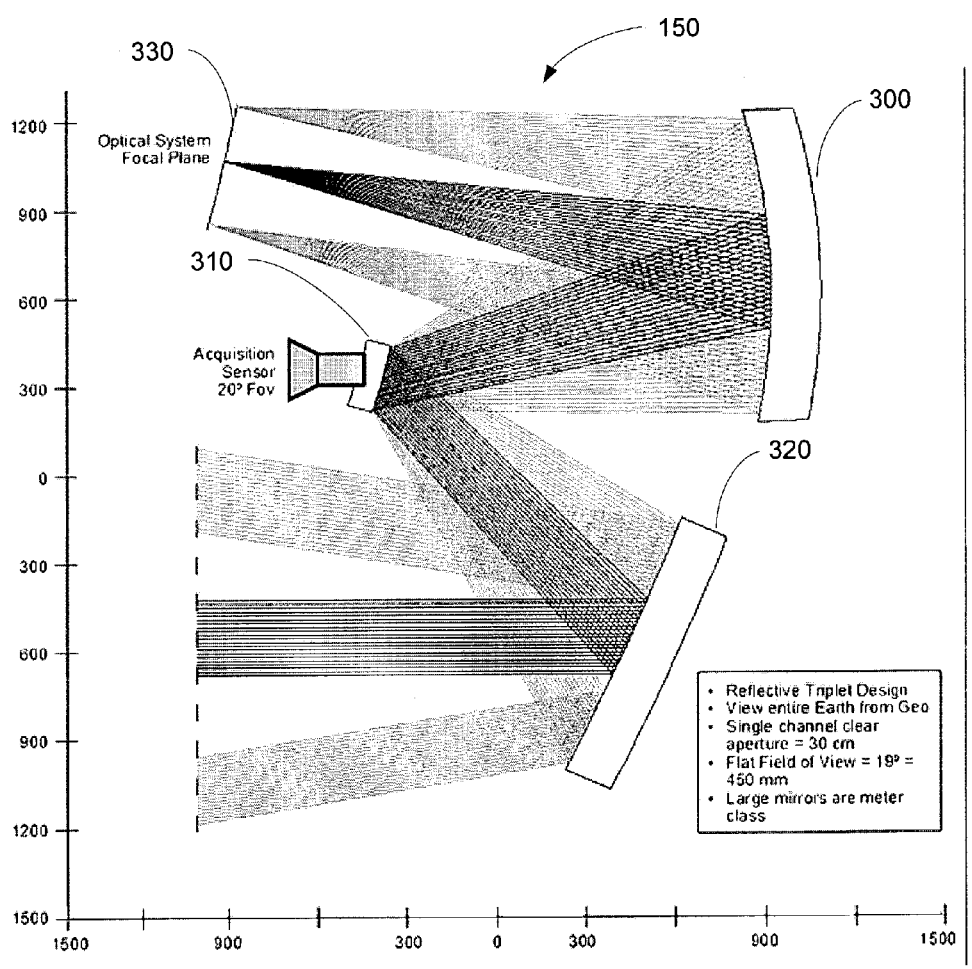
FIG. 2 illustrates an embodiment of the present invention.

FIG. 2 illustrates an embodiment of the present invention. In particular, FIG. 2 illustrates optical assembly 150 may be embodied as a reflecting triplet configuration with one infinite conjugate. Other configurations may be used in light of the present disclosure. In the present embodiment, the flat field of view is approximately 20 degrees.

In the present embodiment, optical assembly 150 includes a primary mirror 300, a secondary mirror 310, and a tertiary mirror 320. As shown, laser transmissions striking tertiary mirror 320 are reflected from secondary mirror 310, reflected from primary mirror 300, and focused onto a focal plane 330. In this embodiment, focal plane defines a 450 mm diameter circular area and is flat. In the present embodiment, both primary mirror 300 and tertiary mirrors 320 are meter class and may weigh less than 25 kg each if fabricated from light-weight Silicon Carbide.

Figure 3:
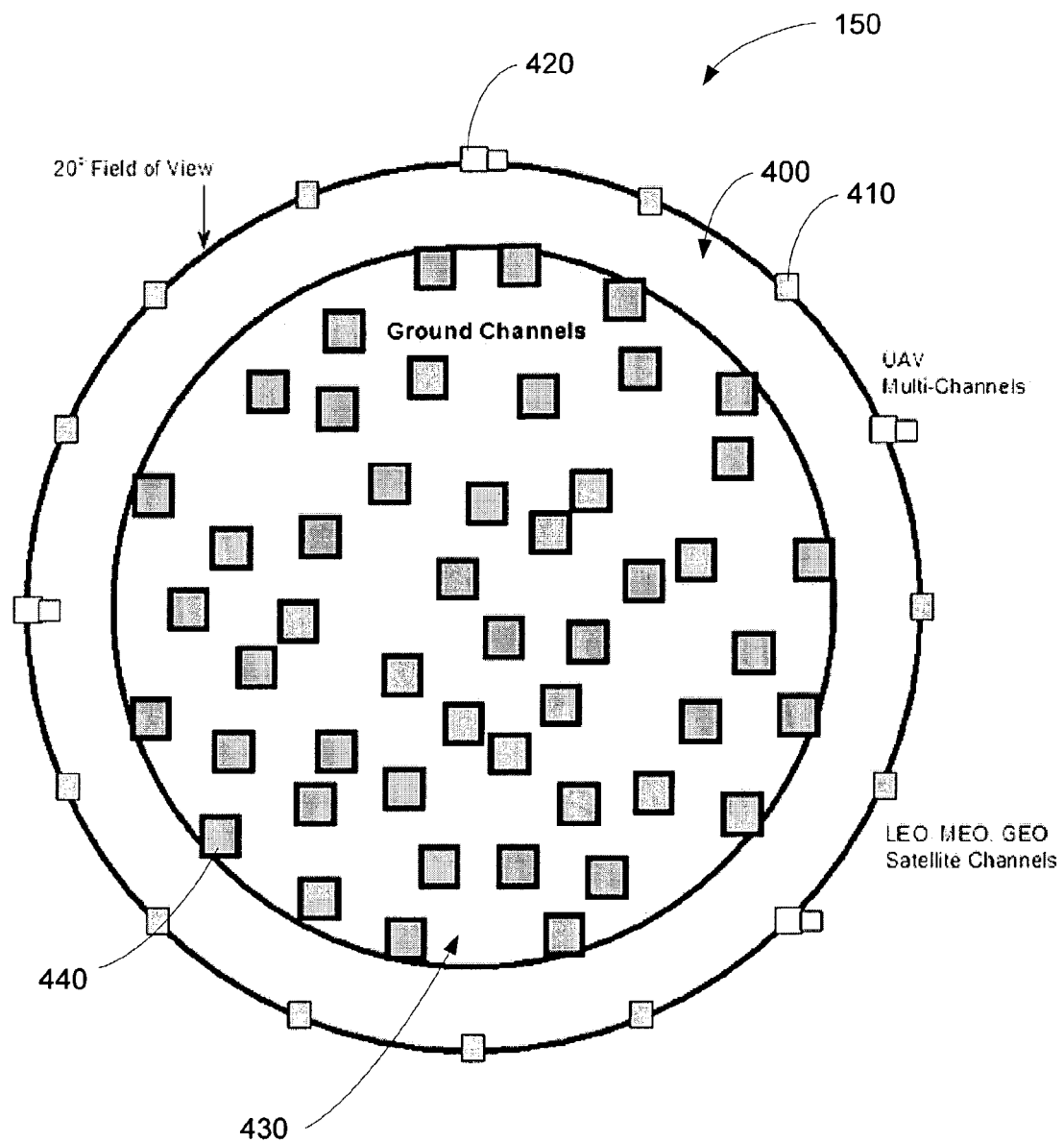
FIG. 3 illustrates an embodiment of a focal plane layout.

FIG. 3 illustrates an embodiment of a focal plane layout. More particularly, referring to FIG. 1, FIG. 3 illustrates a layout configuration for laser communication modules 160 in focal plane 170.

In the present embodiment, the laser communication modules 160 are divided into two concentric zones. As illustrated, the outer zone 400 includes a number of transmit and receive laser communications modules 410. The number of modules 410 may vary according to specific mission requirements, such as 50 or more, 100 or more, etc. In this embodiment, modules 410 are used to communicate with space-based and/or aerial laser platforms.

In this embodiment, communications modules 410 are fixed in orientation, and the laser communications are guided to and from each module 410 through the combination of optical assembly 150, steering mirrors 120 and static mirrors 140. For example, a transmission from a module 410 is input to optical assembly 150 and redirected by a static mirror 130 to a steering mirror 120. The steering mirror 120 then directs the laser transmission out to the laser platform. Each of the other communications modules 410 are also typically redirected by a static mirror 130 to a steering mirror 120, and onto respective laser platforms, at the same time.

As discussed above, the rough positions of steering mirrors 120 are determined in response from orientation data from AT 110. In the present embodiment, when maintaining communication with laser platforms, the position of steering mirrors 120 are typically periodically adjusted. Fine positioning data, described below, is used to determine further adjust the positions of steering mirrors 120. Because steering mirrors 120 are periodically adjusted, communications with space-based and/or aerial laser platforms can be maintained while within the field of view for communications system 100.

In one embodiment of the present invention, certain communications modules 410, may send and receive laser communications from closely-spaced laser platforms, such from multiple UAVs within a particular theater. These communications modules 420 may include multiple independent sub-channels to provide communications to the multiple platforms.

In FIG. 3, the inner zone 430 includes modules 440 that are used to communicate with surface (earth)-based platforms. In contrast to modules 410, modules 440 are typically movable within the focal plane. In one specific embodiment, modules 440 may take up a 10 mm square on the focal plane, and each module 440 can be articulated in the X and Y directions over a limited range of motion. In one embodiment, an X and Y movement of +/−10 mm represents an area of approximately +/−240 kilometers on the ground. Because modules 440 are movable, most all positions within inner zone 430 can be covered by a module 440. Accordingly, communications from surface-based laser sources may be exchanged from most all positions on the side of the earth facing system 100.

FIG. 4 illustrates embodiments of transmit/receive modules according to the present invention. In the present embodiment, communications modules (transmit/receive modules) may be configured in a number of ways, depending upon specific requirements. Each communication module typically provides the functions of providing laser transmissions, receiving laser communications, providing fine pointing tracking, and providing a correct point-ahead relationship between the transmit and receive devices.

One embodiment for communications module is illustrated as module 600. In this example, module 600 may provide laser communications for ground based and UAV laser sources. In the embodiment illustrated, module 600 includes a movable tracker sensor 610 at a focal plane 620 of optical assembly 150. In the present embodiment, tracker sensor 610 includes an array of sensors 620, such as a 256×256 array of CCD elements. Additionally, a receiving fiber 630 is provided in focal plane 620 to receive laser communications. As will be described below, sensors 620 are used to reposition tracker sensor 610 within focal plane 620.

Module 600 may also include a quarter wave plate 640, a polarizing beam splitter 650, and a transmit fiber 660. Transmit fiber 660 is typically position to be at a focal distance of optical assembly 150.

Another embodiment for communications module is illustrated by module 690. For satellites, a transmit/receive offset is required to compensate for the instantaneous mutual orbital dynamics of communications system 100 and a space-based laser source. In this embodiment, module 690 includes an X-Y micro-stage 670 having a range of less than 0.2 mm and position accuracies of less than 0.2 microns coupled to transmit fiber 660. As will be described below, micro-stage 670 is used to determine the orientation of transmitter fiber 660 to provide an appropriate transmit look-ahead.

In this embodiment, an additional optical element 680 provides an image of transmitter fiber 660 output on to sensors 620. The location on sensors 620 indicates the orientation of transmitter fiber 660. In the embodiment illustrated, an additional fixed off-set is used between the laser transmissions to optically separate the laser transmissions from the space-based laser source and from communications system 100. Accordingly, accurate tracking of both transmissions are made with reduced mutual interference effects.

In another embodiment, a communications module may be embodied in a configurations based upon from the technology described in the patent application incorporated by reference above. Using such a design, a communications module is able to exchange laser communications from multiple-channels at the same time, such as multiple high-altitude collector UAVs deployed within a single military theater of operation. Additionally, according to the patent application discussed above, the receiver fiber may also include a quad-cell type structure for additional positioning precision within the focal plane.

Figure 5A:
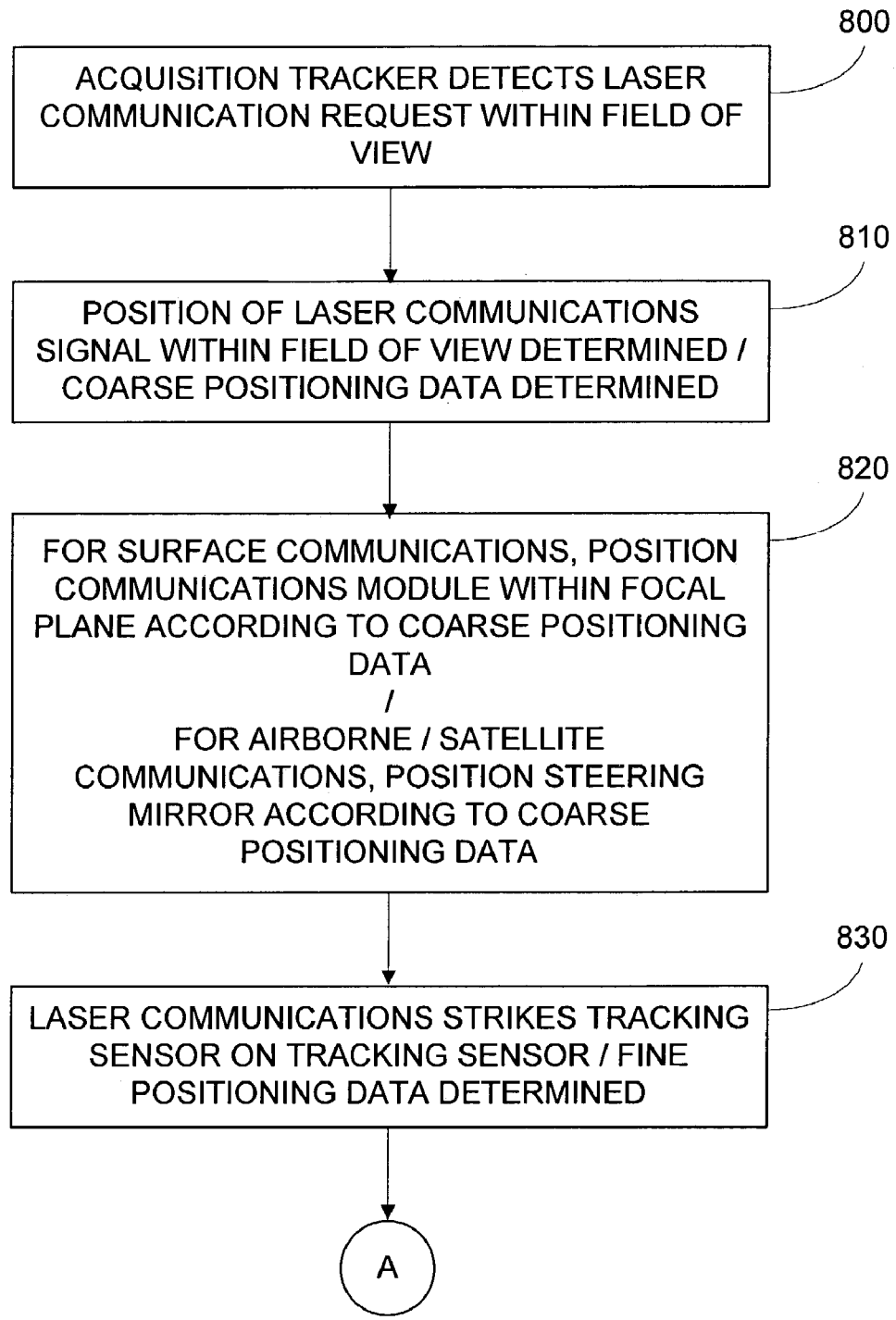
FIGS. 5A-C illustrate a block diagram of a method according to an embodiment of the present invention.
Figure 5B:
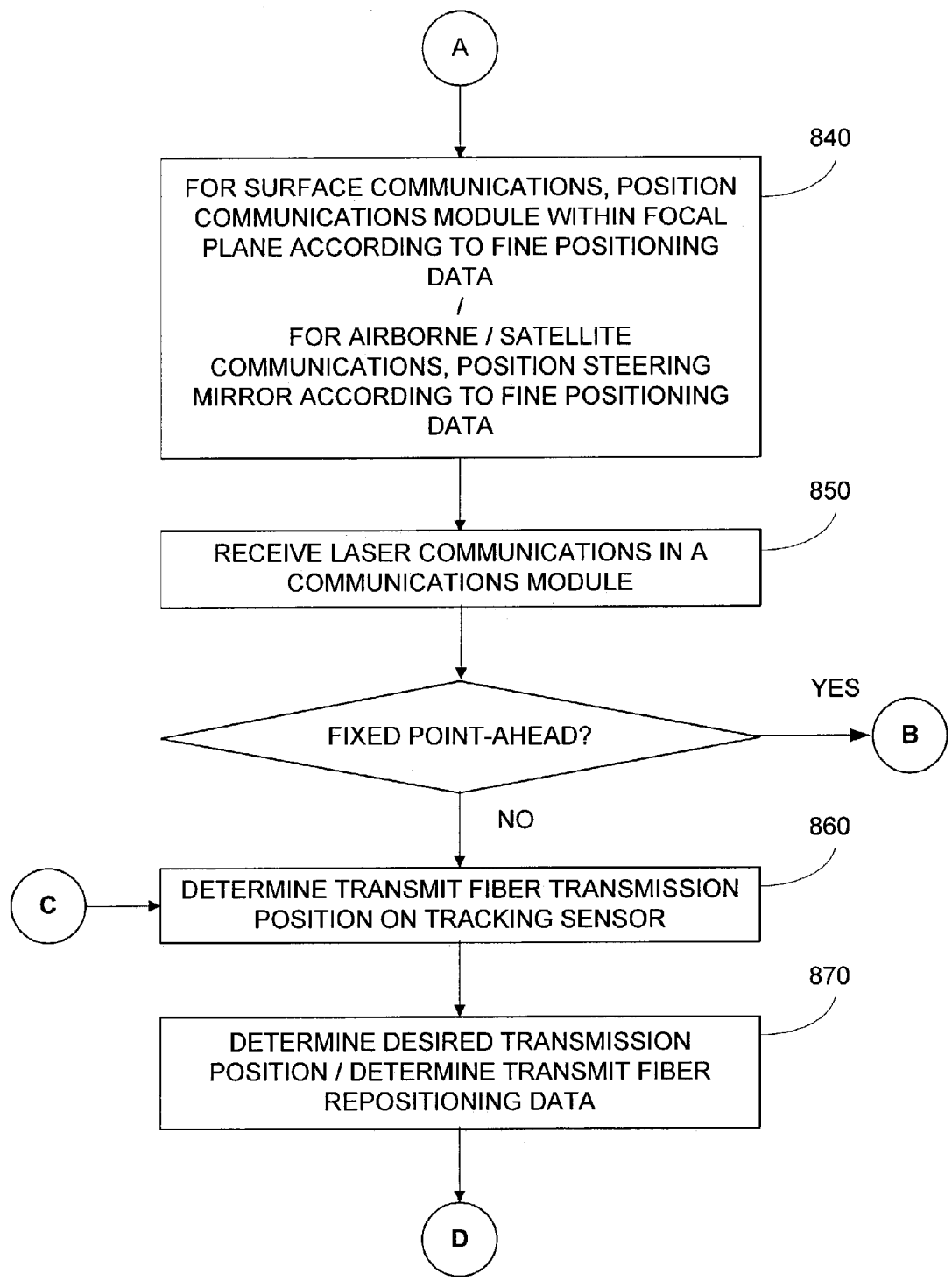
Figure 5C:
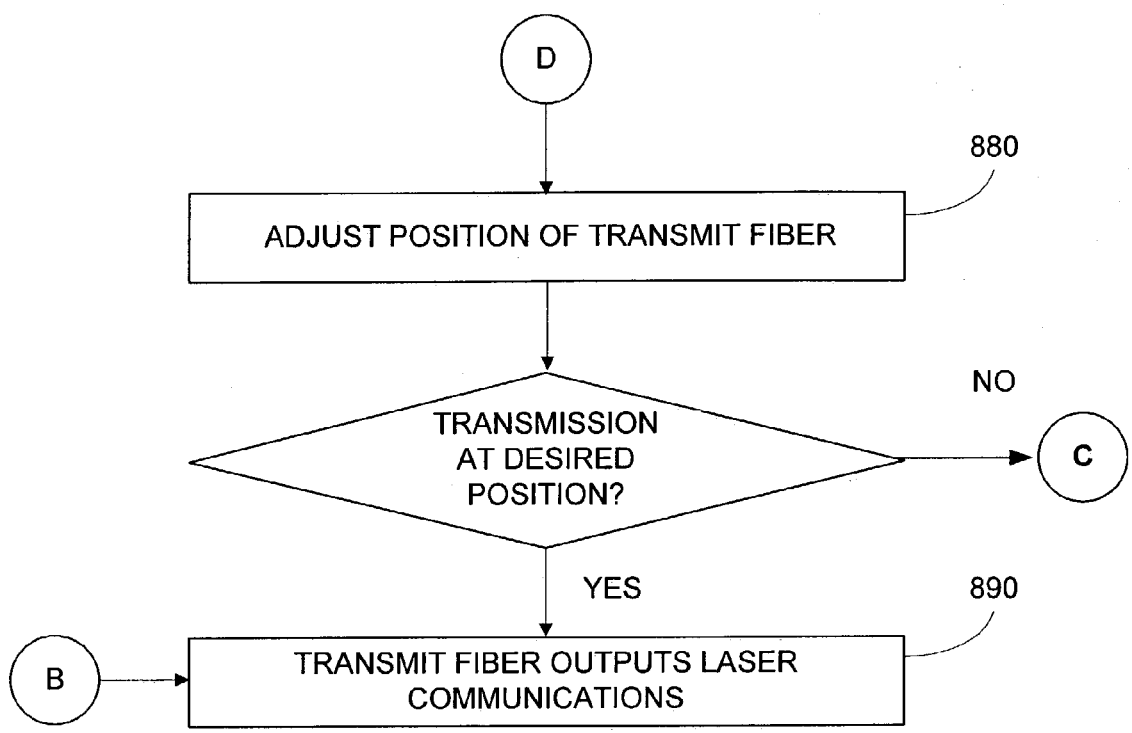

FIGS. 5A-C illustrate a block diagram of a method according to an embodiment of the present invention.

In operation, a laser communications signal from a laser terminal, such as a ground-channel is initially detected by AT 110, step 800. The location of the laser source within the field of view is determined, step 810, and a module, such as module 600 is positioned within focal plane 620, step 820. In the case of a space-based source, steering mirror 120 is adjusted.

Next, the location where the laser signal strikes tracker sensor 610 is determined, step 830. In response, module 600 is repositioned within focal plane 620, such that the laser signal is input into receiving fiber 630, step 840. The laser signal is then decoded, step 850.

In one embodiment of the present invention, the movement of communications system 100 relative to ground-channels are high, but relatively constant. To compensate for the relatively constant movement, the orientations of transmitter fiber 660 is given a fixed offset relative to receiver fiber 630 when the satellite has a fixed orbit. In other words, the laser transmissions to a ground channel typically do not follow the same path as the laser communications from the ground-channel. In one embodiment, the offset is typically determined a priori and set. In other embodiment, the techniques described below may also be used for surface-based laser sources.

In other embodiment of the present invention, the movement of communications system 100 and a laser source is not fixed or constant. For example, when communicating with a space-based laser sources, the orbits of communications system 100 and the orbits of laser sources may be very different and thus the relative instantaneous movement is high. To compensate for the variable movement, the orientation of transmitter fiber 660 varies with time relatively to receiver fiber 630.

In this embodiment, a feed-back loop is provided to properly orient transmitter fiber 660 to compensate for the variable movement. As illustrated in FIG. 4, a laser transmission from transmitter fiber 660 is reflected to array of sensors 620. Communications system 100 then determines where the laser transmission currently strikes array of sensors 620, step 860, and where the laser transmissions should strike array of sensors 620, step 870. By tracking where the laser transmission strikes array of sensors 620, communications system 100 can reorient transmitter fiber 660 until the proper transmit look-ahead is achieved, step 880. This process may be repeated periodically to compensate for the relative movement.

In the present embodiment, data to be transmitted is then encoded and output onto transmitter fiber 660, step 890. The laser transmission is reflected off of polarizing beam splitter 650, and output through quarter wave plate 640. The transmission reflects off of a static mirror and a steering mirror and is reflected to a target destination.

In embodiments of the present invention, communications with more than one hundred ground-channels may be maintained at the same time. In other embodiments, the number may vary according to specific mission.

In view of the above disclosure, many other variations can be envisioned. For example, wave division multiplexing WDM may be used to increase the number of communications channels. For example, using WDM, more than one wavelength of laser communications may be received and transmitted for each receiving and transmitting element. Such embodiments would greatly increase the number of simultaneous communications, and greatly increase the data rate. In still other embodiments, DWDM techniques may also be used.

In other embodiments, non-inertial steering portion such as a spatial light modulator or optical phased array can be used instead of a physical steering mirror. Using such an array, redirection from one theater to another theater is expected to be done in less than 1.0 milliseconds compared to the <50 milliseconds of a physical mirror. As the technology of the non-inertial steering systems matures, one of these devices can be substituted for the fast steering mirror with no other changes to the basic system design.

The above embodiments include an equal number of transmitting elements as receiving element, however in other embodiments, the number of transmitting elements and receiving elements may be different. For example, in some embodiments, the number of receiving elements may be greater than the number of transmitting elements. Such embodiments may be useful for collection of laser communications from multiple assets with transmissions to a limited number of command and control units.

In other embodiments, modules 410 within the outer zone 400 may also be used for communications with surface-based laser communications devices, and modules 430 within the inner zone 430 may also be used for communications with space-based laser communications devices. In still other embodiments, transmissions need not be made back to the same source. For example, a receiving portion of module may receive laser communications from a source in Asia, and the transmitting portion of the module may have an offset that points to a receiver in the U.S. Such embodiments may be configured as a module 410, a module 440, or as described in the above-referenced patent application.

The communications modules may also have different tracker sensors of different resolution. For example, in one embodiment, a tracker sensor is a 256×256 CCD array. In other embodiments, the array may be 512×512, 1024×768, or the like. In still other embodiments, the shape may be roughly hexagonal, octagonal, circular, or the like. In additional embodiments, the individual sensors may be roughly square, or any other shape.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A communications terminal comprising:
   a first aperture configured to receive laser communications signals from ground-based laser communications sources;
   a plurality of pick-off mirrors configured to receive laser communications signals from mobile laser communications sources;
   an optical assembly configured to receive the laser communications signals from the ground-based laser communications sources and the mobile laser communications sources, wherein the optical assembly is configured to focus laser communications signals from the ground-based laser communications sources and the mobile laser communications sources onto a focal plane;
   a first plurality of laser communications receivers located in an inner region of the focal plane, wherein each of the first plurality of laser communications receivers is configured to receive laser communications signals from at least one of the ground-based laser communications sources at a time; and
   a second plurality of laser communications receivers located in an outer region of the focal plane, concentric with the inner region of the focal plane, wherein each of the second plurality of laser communications receivers is configured to receive laser communications signals from at least one of the mobile laser communications sources at a time.

2. The communications terminal of claim 1 further comprising a plurality of laser communications transmitters located at the focal plane, wherein each laser communications transmitter is configured to transmit laser communications signals to at least one laser communications source at a time.

3. The communications terminal of claim 1 wherein the pick-off mirrors comprise a plurality of movable mirrors and a plurality of static mirrors.

4. The communications terminal of claim 1 wherein the mobile laser communications sources are selected from the group consisting of laser platforms in low earth orbit, laser platforms in medium earth orbit, laser platforms in geosynchronous orbit and aerial laser platforms.

5. The communications terminal of claim 1 wherein the ground-based laser communications sources are selected from the group consisting of fixed land-based laser platforms, mobile land-based laser platforms and ship-based laser platforms.

6. The communications terminal of claim 1 wherein at least one laser communications receiver from the first plurality of laser communications receivers comprises a tracking mechanism and a receiving fiber in the focal plane, and wherein the tracking mechanism is configured to position the receiving fiber in the focal plane.

7. The communications terminal of claim 6 further comprising at least one laser transmitter fiber located at the focal plane,
   wherein the tracking mechanism is configured to position the laser transmitter fiber in the focal plane.

8. A method for a communications terminal, comprising the steps of:
   receiving laser communications from a plurality of ground-channel laser communications sources;
   receiving laser communications from a plurality of mobile-channel laser communications sources;
   directing the laser communications from the plurality of ground-channel laser communications sources and the laser communications from the plurality of mobile-channel laser communications sources onto a common focal plane;
   receiving the laser communications from the plurality of ground-channel laser communications sources in a plurality of ground communications modules located in an inner region of the common focal plane; and receiving the laser communications from the plurality of mobile-channel laser communications sources in a plurality of mobile communications modules located in an outer region of the common focal plane concentric with the inner region.

9. The method of claim 8 wherein the plurality of mobile-channel laser communications sources are selected from the group consisting of satellite laser communications sources and unmanned aerial vehicle communications sources.

10. The method of claim 8
wherein at least one of the plurality of ground communications modules comprises a tracker sensor and a receive fiber disposed in the common focal plane, and
wherein the method further comprises:
determining a location on the tracker sensor where a laser communications signal from a ground-channel laser communications source strikes the tracker sensor; and
positioning the receive fiber to receive the laser communications signal from the ground-channel laser communications source in response to determining the location on the tracker sensor.

11. The method of claim 10
wherein the ground communications module further comprises a transmit fiber; and
wherein the method further comprises transmitting laser communications signals to the ground-channel laser communications source.

12. The method of claim of claim 8
wherein a mobile communications module comprises a tracker sensor, a receive fiber, and a transmit fiber disposed in the common focal plane; and
wherein the method further comprises:
determining a first location on the tracker sensor where a laser communications signal from a mobile-channel laser communications source strikes the tracker sensor;
positioning the receive fiber to receive the laser communications signal from the mobile-channel laser communications source in response to the first location on the tracker sensor, wherein the receive fiber is located at a second location on the tracker sensor;
determining a third location on the tracker sensor where a laser communications signal from the transmit fiber strikes the tracker sensor;
positioning the transmit fiber to transmit the laser communications signal to the mobile-channel laser communications source in response to the third location on the tracker sensor; wherein the laser communications signal from the transmit fiber strikes the tracker sensor at a fourth location on the tracker sensor; and
transmitting laser communications signals to the mobile-channel laser communications source.

13. The method of claim 12 wherein the second location on the tracker sensor and the fourth location on the tracker sensor are different.

14. A laser communications satellite comprising:
a first plurality of laser channel modules, each module configured to receive laser communications from at least a first class of laser communications sources;
a second plurality of laser channel modules, each module configured to receive laser communications from at least a second class of laser communications sources;
an optical system configured to direct laser communications from the first class of laser communications sources to the first plurality of laser channel modules, and configured to direct laser communications from the second class of laser communications sources to the second plurality of laser channel modules, wherein each of the first plurality of laser channel modules is located in an inner region of a focal plane of the optical system, and wherein each of the second plurality of laser channel modules is located in an outer region of a focal plane of the optical system concentric with the inner region; and
a movable assembly configured to direct laser communications from the second class of laser communications sources to the optical system.

15. The laser communications satellite of claim 14 wherein the first class of laser communications sources comprises land-based laser communications sources.

16. The laser communications satellite of claim 14 wherein the second class of laser communications sources comprises laser communications sources selected from the group consisting of airborne, laser communications sources and space-based laser communications sources.

17. The laser communications satellite of claim 16
wherein the first plurality of laser channel modules are also configured to transmit laser communications to a land-based laser communications source;
wherein the second plurality of laser channel modules are also configured to transmit laser communications to a space-based laser communications source; and
wherein the laser communications satellite also comprises a point-ahead compensating unit configured to determine transmit compensation factors for the first plurality of laser channel modules and transmit compensation factors for the second plurality of laser channel modules.

18. The laser communications satellite of claim 17 wherein the transmit compensation factors for the first plurality of laser channel modules is a fixed point-ahead.

19. The laser communications satellite of claim 17 wherein the transmit compensation factors for the second plurality of laser channel modules is a variable point-ahead.

* * * * *